United States Patent Office 3,551,522
Patented Dec. 29, 1970

3,551,522
METHOD FOR FORMING HIGH IMPACT POLYMERS
John M. Miles, Wilbur N. Killebrew, Jr., and James Q. Wood Bartlesville, Okla., assignors to Phillips Petroleum Company, a corporation of Delaware
No Drawing. Filed Oct. 26, 1967, Ser. No. 678,168
Int. Cl. C08f 19/04, 15/04
U.S. Cl. 260—878                       4 Claims

ABSTRACT OF THE DISCLOSURE

A high impact polymer is formed by providing a mixture of at least one conjugated diene and at least one 1-olefin, polymerizing the conjugated diene, completing the polymerization at a temperature above the upper cloud point of the polymerization reaction mixture, removing a portion of the 1-olefins if desired, adding at least one monovinyl-substituted aromatic compound, and polymerizing the monovinyl-substituted aromatic compound and the 1-olefin.

---

This invention relates to a new and improved method for making high impact polymer compositions, particularly high impact polystyrene compositions.

Heretofore high impact polymer compositions such as high impact polystyrene compositions, have been formed by first making a rubber polymer such as polybutadiene, separating that polymer from the polymerization reaction mixture solution, dissolving the rubbery polymer in another solvent or a monovinyl-substituted aromatic compound such as styrene, and then polymerizing the monovinyl-substituted aromatic compound to form a graft copolymer comprising a polymer of the monovinyl-substituted aromatic compound grafted onto the polybutadiene. This process involves many steps and also requires the use of extraneous solvent which must be removed by way of expensive solvent removal operations. It should be noted that prior known processes formed the rubbery polymer in solution, removed that polymer from solution, and then redissolved the polymer in another solvent and/or the monovinyl-substituted aromatic compound to be polymerized.

Also heretofore rubbery copolymers of conjugated dienes and 1-olefins have been physically blended with a polymer of a monovinyl-substituted aromatic compound. In making such blends the rubbery copolymer is separately made and separated from solution while the polymer of the monovinyl-substituted aromatic compound is also prepared in a separate polymerization operation and recovered therefrom.

It has now been found that high impact polymer compositions can be formed without the use of an extraneous solvent and without having to remove the rubbery polymer from the solution before combining same with the monovinyl-substituted aromatic compound by providing a monomer composition which contains at least one 1-olefin and at least one conjugated diene, polymerizing the conjugated diene in the monomer composition, completing the polymerization at a temperature above the upper cloud point of the polymerization reaction mixture, if desired, removing from the polymerization reaction mixture a part of the 1-olefins, adding to the polymerization reaction mixture at least one of during and after the removal of 1-olefins at least one monovinyl-substituted aromatic compound, and then polymerizing the 1-olefin and monovinyl-substituted aromatic compound present in the reaction mixture to thereby form a graft copolymer from the 1-olefin, monovinyl-substituted aromatic compound, and the conjugated diene polymer.

By this process the rubbery conjugated diene polymer formed is not separated from the solution in which it is formed thereby eliminating the prior art steps of removing the rubbery polymer from its solution and redissolving same in the monovinyl-substituted aromatic compound. In addition, no extraneous solvent is employed thereby eliminating expensive and time consuming solvent removing and solvent purification operations.

The high impact polymer compositions produced by the method of this invention are useful in generally any application known for high impact polymers such as high impact polystyrene compositions. For example, the polymers produced by the methods of this invention can be employed in making bottle carriers, tote boxes, protective cabinets for electronic devices, and the like.

Accordingly, it is an object of this invention to provide a new and improved method for making high impact polymers.

It is a particular object of this invention to provide a new and improved method for making high impact polystyrene compositions.

Other aspects, objects, and the several advantages of this invention will be apparent to one skilled in the art from the following description and appended claims.

According to this invention a monomer feed is provided which contains from about 1 to about 70 weight percent, based on the total weight of the monomer feed, of at least one 1-olefin having from 2 to 8 carbon atoms per molecule, inclusive, the remainder of the monomer feed being essentially at least one conjugated diene having from 4 to 12 carbon atoms per molecule, inclusive. Therefore, the amount of conjugated diene present in the monomer feed can vary from about 30 to about 99 weight percent based on the total weight of the monomer feed.

It is presently preferred to employ from about 50 to about 70 weight percent of at least one 1-olefin and from about 30 to about 50 weight percent of at least one conjugated diene, both weight percentages being based on the total weight of the monomer feed. In this situation the 1-olefin acts as a diluent and provides a greater body of liquid for better heat transfer and easier mixing. In this situation some of the 1-olefin must be removed from the 1-olefin-rich phase before the additional monomer (monovinyl-substituted aromatic compound) is added and polymerized.

Suitable conjugated dienes include 1,3-butadiene, isoprene, 1,3-pentadiene, 1,3-hexadiene, 2,3-dimethyl-1,3-butadiene, 1,3-octadiene, 4-phenyl-1,3-butadiene, 1,3-dodecadiene and the like. Preferred conjugated dienes are butadiene, isoprene, and 1,3-pentadiene.

Suitable 1-olefins (mono-1-olefins) include aliphatic 1-olefins such as ethylene, propylene, butene-1, isobutylene, hexene-1, isooctylene, and the like. Preferred 1-olefins are butene-1 and isobutylene.

The polymerization of the monomer feed is carried out in any conventional manner which will polymerize the conjugated diene present leaving the 1-olefin substantially unpolymerized at that time. Such polymerization processes are well known in the art and merely involve the use of a catalyst which will polymerize conjugated dienes. This invention is applicable to any process which will polymerize conjugated dienes without substantially polymerizing 1-olefins. A full and complete disclosure of suitable polymerization processes and catalysts applicable thereto is set forth in U.S. Pat. 3,095,406, the disclosure of which is hereby incorporated herein by reference. Particularly suitable catalysts for this polymerization process are lithium based catalysts. Lithium based catalysts include lithium metal, 1,3-dilithiobenzene, 3-bromophenyllithium, 3-bromo-1-naphthyllithium, 3-chlorophenyllithium, 3-chloro-1-naphthyllithium, 3-fluorolithium, 3-fluoro-1-naphthyllithium, 1-chloro-3-naphthyllithium, 1-fluoro - 3 - naphthyllithium, 1-bromo - 3-naphthyllithium, organo lithium compounds which correspond to the formula $R(Li)_x$, wherein R is a hydrocarbon radical selected from the group consisting of aliphatic, cycloaliphatic, and aromatic radicals, $x$ is an integer from 1 to 4, inclusive, the aliphatic and cycloaliphatic radicals can be saturated or contain olefinic unsaturation, R has a valence equal to the integer and preferably contains from 1 to 20 carbon atoms, inclusive, reaction products of the above organo lithium compounds with a polyvinyl aromatic compound such as divinylbenzene and, optionally, a conjugated diene wherein the polyvinyl aromatic compounds contain 1 or 2 aromatic rings and 2 or 3 vinyl groups. Mixtures of these lithium based catalysts can also be employed.

Examples of suitable organo lithium compounds within the formula $R(Li)_x$ are methyllithium, isopropyllithium, n-butyllithium, tert-octyllithium, n-decyllithium, phenyllithium, naphthyllithium, 4-butylphenyllithium, p-tolyllithium, 4-phenylbutyllithium, cyclohexyllithium, 4-butyl-cyclohexyllithium, 4-cyclohexylbutyllithium, dilithiomethane, 1,4-dilithiobutane, 1,10-dilithiodecane, 1,20-dilithioeicosane, 1,4-dilithiocyclohexane, 1,4-dilithio - 2 - butene, 1,8-dilithio - 3 - decene, 1,4-dilithiobenzene, 1,4-dilithionaphthalene, 1,2 - dilithio - 1,3 - diphenylethane, 9,10-dilithio - 9,10 - dihydroanthracene, 1,2 - dilithio - 1,8 - diphenyloctane, 1,3,5 - trilithiopentane, 1,5,15 - trilithioeicosane, 1,3,5 - trilithiocyclohexane, 1,2,5 - trilithionaphthalene, 1,3,5 - trilithioanthracene, 1,3,5,8 - tetralithiodecane, 1,5,10,20 - tetralithioeicosane, 1,2,4,6 - tetralithiocyclohexane, 1,2,3,5 - tetralithio - 4 - hexylanthracene, 1,3 - dilithio - 4 - cyclohexene, and the like.

Generally, from about 0.05 to about 2 parts by weight of the lithium based catalyst per 100 parts by weight of total monomers to be polymerized is employed. Broad polymerization conditions can be used, e.g., temperatures of from about —50 up to about 300° F. and pressures sufficient to maintain the reaction mixture substantially in the liquid phase.

It should be noted that this polymerization step is carried out without the addition of an extraneous solvent such as cyclohexane and the like so that there is no need to provide expensive additional steps for separating the conjugated diene polymer formed from an extraneous solvent and purifying the solvent for reuse. Instead, the polymerization reaction mixture now comprising polymer of conjugated diene and unpolymerized 1-olefins present in the original monomer composition are all that is present and therefore an additional monomer such as a monovinyl-substituted aromatic compound and additional catalysts for polymerizing that additional monomer can be simply added to the existing polymerization reaction mixture thereby forming the desired final polymer without having to separate the conjugated diene polymer from solution and without having to utilize or separate at any time any extraneous solvent.

Before adding additional monomer and catalyst, it has been found that the amount of 1-olefin desired to remain in the final polymer product of the process can be provided for at this point of the process. If the process of polymerizing a conjugated diene is carried out so that the final temperature of the polymerization reaction mass is above at least 200° F., preferably in the range of from about 200 to about 500° F., the polymerization reaction mass will separate into two contiguous liquid phases, one phase being rich in 1-olefins and the other phase being rich in the polymer of a conjugated diene. When the polymerization reaction mixture is in this physical state then, if desired, any amount of 1-olefins can be conveniently removed from the polymerization reaction mixture without disturbing or removing any substantial amount of polymer. By removing 1-olefins from the polymerization reaction mixture at this time the amount of 1-olefins remaining can be tailored to that amount desired to remain in the final polymer product. Thus, from 0 to about 90, preferably from about 10 to about 90, weight percent of and based on the phase in the polymerization reaction mixture which is rich in 1-olefins can be removed before additional monomer and catalyst are added and any further polymerization carried out. It should be noted that it may not be desirable to remove any of the 1-olefin phase or it may be desirable to remove any amount up to 90 percent of that phase.

Thereafter, additional monomer is added in the form of at least one monovinyl-substituted aromatic compound, preferably styrene. Suitable monovinyl-substituted aromatic compounds are those containing from 8 to 12 carbon atoms per molecule, inclusive, for example, besides styrene, 3-methylstyrene, 4-methylstyrene, 4-isopropylstyrene, 2,4-dimethylstyrene, 1-vinylnaphthalene, 2-vinylnaphthalene, and the like.

The amount of additional monomer added can vary widely but will generally be that which will give a polymerization reaction mixture containing from about 50 to about 98 weight percent monovinyl-substituted aromatic compound or compounds, from about 1 to about 25 weight percent of one or more 1-olefins, and from about 1 to about 25 weight percent of at least one polymer of at least one conjugated diene, all weight percentages being based on the total weight of the polymerization reaction mixture. The final high impact polymer product produced will also contain in the form of a graft copolymer from about 1 to about 25 weight percent of each of the 1-olefin and conjugated diene constituents and from about 50 to about 98 weight percent of one or more monovinyl-substituted aromatic compounds, the 1-olefin and monovinyl-substituted aromatic constituents forming one or more polymers that are grafted onto the conjugated diene polymer.

The monovinyl-substituted aromatic compound and 1-olefin compound can be polymerized in any conventional manner known in the art. Here again a large number of processes and catalysts are available and known in the art to be suitable for polymerizing monovinyl-substituted aromatic compounds and 1-olefins. Such catalysts include peroxides of the formulae (1) ROOH, (2) ROOR,

wherein R is alkyl, cycloalkyl, and aryl radicals containing from 1 to 14 carbon atoms per molecule, inclusive, the R's in the Formulae 2 and 3 being similar or different radicals. Additional catalysts that can be employed are peresters such as tertiary-butylperbenzoate, di-tertiary-butyldiperphthalate, and aliphatic azo compounds such as azo-bis-isobutyronitrile, and azo-bis-cyclohexane carbonitrile. It should be noted that other perester compounds and other aliphatic azo compounds known in the art can be employed as catalysts as well. Generally, from about 0.05 to about 5 parts by weight of the catalyst per 100 parts by weight of the total monomers to be polymerized are employed. The polymerization reaction is carried out in an elevated temperature, generally from about 50° F. to about 175° F., under pressures which will maintain the polymerization reaction mixture substantially in the liquid phase. Here again, it should be noted that no extraneous solvent is employed so that all that remains of the polymerization reaction mass after completion of this polymerization step is the desired final polymer plus unreacted monomer which can be easily vaporized away from the polymer in a much less expensive operation and with much less loss of time than would be necessary to remove and purify a substantial amount of extraneous solvent.

At the completion of this polymerization step the desired high impact graft copolymer formed is separated from the remaining unreacted monomer in a conventional manner, e.g., conventional distillation, vacuum flashing, thin film evaporation, and the like, and any conventional additive such as antioxidants, other stabilizers, pigments, foaming agents, plasticizers, and the like can be incorporated into the graft copolymer.

EXAMPLE

An initial monomer composition containing 13 weight percent 1,3-butadiene, the remaining 87 percent being essentially butene-1 and isobutylene is batch polymerized using about 0.2 part by weight of butyllithium per 100 parts of butadiene present in the monomer composition. No extraneous solvent is added to the monomer composition. The polymerization reaction is initiated at a temperature of 100° F. and the polymerization reaction is continued until substantially all of the conjugated diene had polymerized, the temperature of the polymerization reaction mixture being adjusted at the completion of this polymerization step to be 240° F.

At the completion of this polymerization step there is present in the polymerization reaction mixture two liquid phases, one liquid phase being rich in polybutadiene and the other liquid phase being rich in butene-1 and isobutylene. The polybutadiene-rich phase contains from about 35 to about 40 weight percent polybutadiene, while the butene-1-rich phase contains from about 0.1 to about 0.5 weight percent polybutadiene, the remainder being essentially butene-1 and isobutylene. The polymerization of the butadiene proceeds to substantially 100 percent conversion of the butadienes so that substantially all of the butadiene present in the initial monomer composition is converted to polybutadiene and substantially all of that polybutadiene is present in the polymer-rich phase.

About 10 weight percent of the butene-rich phase is removed from the reaction by a combination of venting the reactor to the atmosphere and decantation of a part of that liquid phase.

During and after the removal of part of the butene-rich phase, styrene is admitted to the polymerization reaction mixture. Thereafter the catalyst, dicumyl peroxide, i.e., bis(α,α-dimethylbenzyl)peroxide, in the amount of 2 parts per 100 parts of monomer to be polymerized is added and the polymerization reaction mixture stirred and heated at 125° F. to the desired degree of conversion of butenes and styrene to the graft copolymer formed from butene, styrene, and polybutadiene.

The polymerization reaction is terminated by the addition of hydroxylamine sulfate and unreacted monomer is removed by vacuum flashing. The polymer so produced is a high impact polystyrene composition.

Reasonable variations and modifications are possible within the scope of this disclosure without departing from the spirit and scope thereof.

We claim:
1. A method for forming high impact polymer comprising:
   (a) providing a monomer composition containing from about 1 to about 70 weight percent based on the total weight of the monomer composition of aliphatic 1-olefins selected from 1-butene and isobutylene the remainder consisting essentially of butadiene;
   (b) adiabatically polymerizing the butadiene with a lithium based catalyst system in the absence of extraneous solvent so that at the completion of said polymerization the polymerization reaction mixture is at a temperature of at least 200° F. and thereby formed are two contiguous liquid phases one of said phases being rich in said 1-olefins and the other of said phases being rich in butadiene polymer;
   (c) removing from about 10 to 90 weight percent of said 1-olefin rich phase;
   (d) adding to said polymerization reaction mixture during or after step (c) at least one monovinyl-substituted aromatic compound having from about 8 to 12 carbon atoms per molecule to provide a polymerization reaction mixture containing from about 50 to 98 weight percent of said at least one monovinyl-substituted aromatic compound, from about 1 to 25 weight percent of said 1-olefins, and from about 1 to 25 weight percent of said butadiene polymer, said weight percentage is based on the total weight of said polymerization reaction mixture; and
   (e) polymerizing said at least one monovinyl-substituted aromatic compound under sufficient pressure to substantially maintain said polymerization reaction mixture in liquid phase and at a temperature from about 50° F. to 175° F. with a catalyst selected from peroxides which can be represented by the following formulas: (1) ROOH, (2) ROOR, and

(3) 

wherein R is one of alkyl, cycloalkyl, and aryl radicals containing from about 1 to 14 carbon atoms per molecule, inclusive, the R's in the Formulae 2 and 3 being the same or different radicals, and tertiary-butyl perbenzoate, di-tertiary-butyl diterphthalate, azo-bis-isobutyronitrile, or azo-bis-cyclohexane carbonitrile.

2. The method according to claim 1 wherein said monomer composition contains from about 50 to 70 weight percent of 1-butene.

3. The method according to claim 2 wherein said at least one monovinyl-substituted aromatic compound is styrene.

4. The method according to claim 3 wherein said catalyst for polymerizing styrene is dicumyl peroxide.

References Cited

UNITED STATES PATENTS

| | | | |
|---|---|---|---|
| 3,068,180 | 12/1962 | Van Amerongen | 260—84.1 |
| 3,151,184 | 9/1964 | Safford et al. | 260—880 |
| 3,299,178 | 1/1967 | Short et al. | 260—880 |
| 3,462,406 | 8/1969 | Natta et al. | 260—94.3 |

FOREIGN PATENTS

| | | | |
|---|---|---|---|
| 654,607 | 12/1962 | Canada | 260—878 |
| 661,456 | 4/1963 | Canada | 260—94.2M |

JAMES A. SEIDLECK, Primary Examiner

U.S. Cl. X.R.

260—94.2, 880